US010830303B2

(12) United States Patent
Kontny et al.

(10) Patent No.: US 10,830,303 B2
(45) Date of Patent: Nov. 10, 2020

(54) SHOCK ABSORBER ASSEMBLY INCLUDING HYDRAULIC STOP MECHANISM WITH STABILIZER PINS

(71) Applicant: BeijingWest Industries Co., Ltd., Beijing (CN)

(72) Inventors: Marek Karol Kontny, Cracow (PL); Tomasz Marzec, Zielonki (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 100 days.

(21) Appl. No.: 16/124,173

(22) Filed: Sep. 6, 2018

(65) Prior Publication Data

US 2019/0154104 A1    May 23, 2019

Related U.S. Application Data

(60) Provisional application No. 62/590,083, filed on Nov. 22, 2017.

(51) Int. Cl.
*F16F 9/49* (2006.01)
*F16F 9/58* (2006.01)
(Continued)

(52) U.S. Cl.
CPC ............... *F16F 9/49* (2013.01); *F16F 9/366* (2013.01); *F16F 9/486* (2013.01); *F16F 9/585* (2013.01)

(58) Field of Classification Search
CPC ...... F16F 9/49; F16F 9/346; F16F 9/06; F16F 9/066; F16F 9/48; F16F 9/067; F16F 9/512; F16F 9/483; F16F 9/585; F16F 9/58
See application file for complete search history.

(56) References Cited

U.S. PATENT DOCUMENTS 2,815,099 A    12/1957   Muller et al.
3,150,747 A     9/1964   Bliven et al.
(Continued)

FOREIGN PATENT DOCUMENTS

DE    102009057165 A1 *  6/2011   ............... F16F 9/49
DE    102014203598 A1     8/2015
(Continued)

OTHER PUBLICATIONS

Extended European Search Report dated Apr. 25, 2019 for counterpart European patent application No. 18207505.1.

*Primary Examiner* — Bradley T King
*Assistant Examiner* — Stephen M Bowes
(74) *Attorney, Agent, or Firm* — William H. Honaker; Dickinson Wright PLLC

(57) ABSTRACT

A shock absorber assembly including a housing along an axis. A hydraulic stop mechanism includes a retainer extending about and fixed to a piston rod, and a ring guide that has a base portion axially adjacent to the retainer and a plurality of catchers each connected to and spaced axially from the base portion and each having a radially outer portion. Each of the catchers defines a channel. A piston ring is axially moveable along the ring guide between a blocked position wherein the piston ring axially abuts the retainer to close the channels, and an unblocked position wherein the piston ring is axially spaced from the retainer to open the channels. The piston ring further includes a plurality of stabilizer pins extending axially and each received by one of the channels of the catchers radially inward of the radially outer portions of the catchers.

20 Claims, 3 Drawing Sheets

(51) Int. Cl.
*F16F 9/36* (2006.01)
*F16F 9/48* (2006.01)

(56) References Cited

U.S. PATENT DOCUMENTS

| | | | |
|---|---|---|---|
| 3,484,819 A | 12/1969 | Tanner | |
| 4,045,008 A * | 8/1977 | Bauer | F16F 9/36 |
| | | | 267/120 |
| 4,108,423 A * | 8/1978 | Skubal | F16F 9/0218 |
| | | | 188/276 |
| 4,312,499 A | 1/1982 | Wossner et al. | |
| 4,328,960 A | 5/1982 | Handke et al. | |
| 4,785,922 A * | 11/1988 | Kiehart | F16F 9/49 |
| | | | 188/281 |
| 4,838,393 A | 6/1989 | Mourray et al. | |
| 5,024,301 A | 6/1991 | Cook | |
| 5,131,512 A * | 7/1992 | Steinhilber | E05F 3/223 |
| | | | 188/282.8 |
| 5,667,041 A | 9/1997 | Jensen | |
| 5,823,305 A | 10/1998 | Richardson et al. | |
| 6,112,868 A * | 9/2000 | Graham | B60G 17/002 |
| | | | 188/318 |
| 6,119,830 A | 9/2000 | Richardson et al. | |
| 8,276,719 B2 | 10/2012 | Trujillo et al. | |
| 8,701,787 B2 | 4/2014 | Shkurti et al. | |
| 9,593,697 B2 | 3/2017 | Baalmann et al. | |
| 9,657,803 B2 | 5/2017 | Slusarczyk et al. | |
| 2002/0104723 A1 | 8/2002 | Obst | |
| 2006/0049014 A1 | 3/2006 | Vanspauwen | |
| 2011/0000753 A1 | 1/2011 | Kim | |
| 2012/0090931 A1 | 4/2012 | Krazewski et al. | |
| 2013/0192940 A1 * | 8/2013 | Furukawa | F16F 9/516 |
| | | | 188/282.1 |
| 2015/0090548 A1 * | 4/2015 | Yamanaka | F16F 9/3221 |
| | | | 188/297 |
| 2015/0330475 A1 | 11/2015 | Slusarczyk et al. | |
| 2016/0091046 A1 | 3/2016 | Soromenho | |
| 2017/0097063 A1 | 4/2017 | Kontny et al. | |

FOREIGN PATENT DOCUMENTS

| | | | | |
|---|---|---|---|---|
| EP | 0639726 B1 | 2/1995 | | |
| EP | 3153738 A1 | 4/2017 | | |
| EP | 3176464 A1 | 6/2017 | | |
| GB | 2199921 A | * | 7/1988 | F16F 9/346 |
| KR | 1020110080746 A | 7/2011 | | |

* cited by examiner

SHOCK ABSORBER ASSEMBLY INCLUDING HYDRAULIC STOP MECHANISM WITH STABILIZER PINS

CROSS-REFERENCE TO RELATED APPLICATIONS

This application claims the benefit of U.S. Provisional Patent Application No. 62/590,083 filed on Nov. 22, 2017 and titled "SHOCK ABSORBER ASSEMBLY INCLUDING HYDRAULIC STOP MECHANISM WITH STABILIZER PINS", the entire disclosure of which is hereby incorporated by reference.

BACKGROUND OF THE INVENTION

1. Field of the Invention

The present invention relates generally to a shock absorber assembly. More particularly, the present invention relates to a shock absorber assembly including a hydraulic stop mechanism for selectively providing increased damping characteristics.

2. Description of the Prior Art

Shock absorber assemblies are known the in the art for damping vibrations during the operation of vehicles. An example of a shock absorber assembly is presented in U.S. Patent Application Publication Number US 2017/0097063 to the Applicant. The shock absorber assembly includes a housing defining a main chamber. An axially moveable piston is disposed in the main chamber for providing a damping force. A piston rod is moveable with the piston. A hydraulic stop mechanism is provided for providing an additional damping force in response to axial movement of the piston rod. The hydraulic stop mechanism includes a retainer and a ring guide, each fixed to the piston rod. The ring guide has a base portion axially adjacent to the retainer and a plurality of catchers spaced from the base portion. Each of the catchers defines a channel. The hydraulic stop mechanism further includes a piston ring that is axially moveable along the ring guide between the catchers and the retainer and sealed relative to the housing. The piston ring is axially moveable between a blocked position in which it axially abuts the retainer to block fluid flow through the channels to provide an increased damping effect, and an unblocked position in which the retainer is spaced from the retainer to allow fluid to pass through the channels to provide a smaller damping force than when the piston ring is in the blocked position.

There remains a need for further improvements to such shock absorber assemblies.

SUMMARY OF THE INVENTION

According to an aspect of the disclosure, a shock absorber assembly is provided which includes a housing disposed about and along a center axis and extending between a first end and a second end and defining a main chamber. A piston is disposed in the main chamber and is axially moveable for providing a damping force in response to movement of the piston. A piston rod is attached to the piston and moveable with the piston. A hydraulic stop mechanism provides an additional damping force in response to axial movement of the piston rod. The hydraulic stop mechanism includes a retainer extending about and fixed to the piston rod. The hydraulic stop mechanism further includes a ring guide fixed to the piston rod and having a base portion axially adjacent to the retainer and a plurality of catchers each connected to and spaced axially from the base portion and each having a radially outer portion. Each of the catchers defines a channel that extends axially. The hydraulic stop mechanism further includes a piston ring that is axially moveable along the ring guide between the catchers and the retainer and sealed radially relative to the housing. The piston ring has a ring portion that is moveable axially between a blocked position and an unblocked position, wherein the ring portion axially abuts the retainer in the blocked position to close the channels to provide an additional damping force, and wherein the ring portion is axially spaced from the retainer when the ring portion is in the unblocked position to allow fluid to pass through the channels to provide a smaller damping force than when the ring portion is in the blocked position. The piston ring further includes a plurality of stabilizer pins extending axially from the ring portion and each received by one the channels of the catchers radially inward of the radially outer portions of the catchers for preventing radially outward movement of the ring portion.

The invention in its broadest aspect therefore provides a hydraulic stop assembly in which the piston ring is prevented from deforming radially outwardly by the stabilizer pins. Preventing such deformation of the piston ring inhibits oil from biasing the piston ring toward the inner surface of the wall and modifying the damping characteristics of the shock absorber assembly.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a shock absorber assembly 20 for a vehicle is generally shown. It should be appreciated that the subject shock absorber assembly 20 may be utilized in conjunction with various types of vehicles including, but not limited to automobiles, motorcycles, and all-terrain vehicles.

Figure 1A:
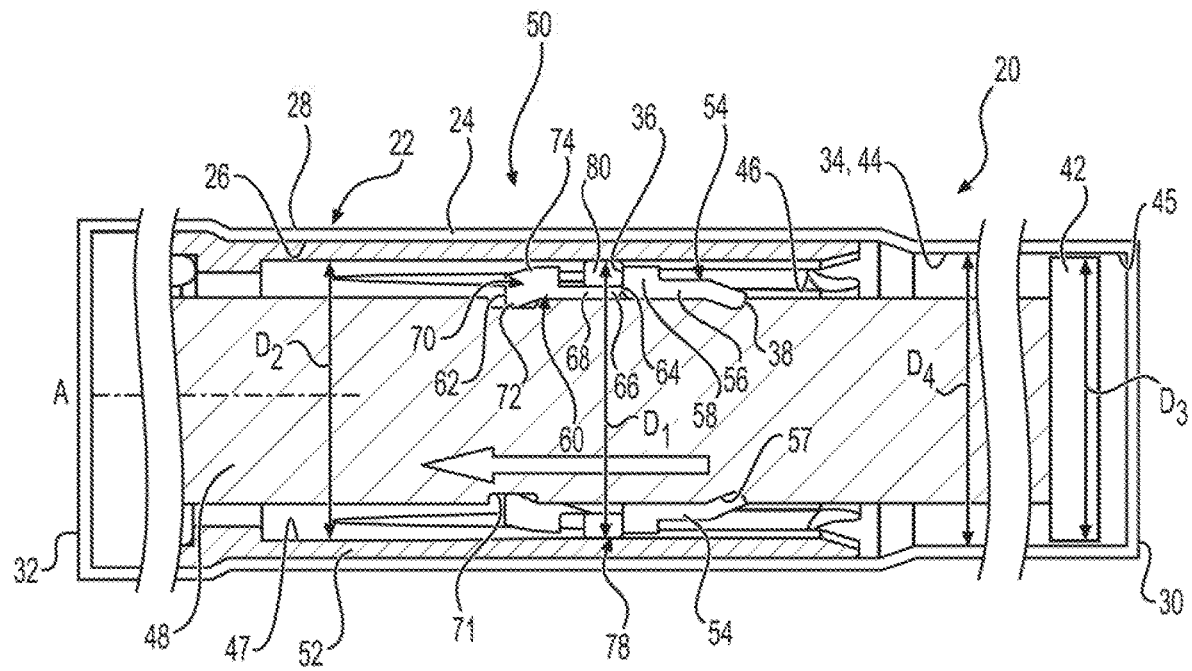
FIG. 1A is a side cross-sectional view of a shock absorber assembly illustrating movement of a piston rod in a compression stroke and a piston ring in a blocked position.
Figures 2A, 2B:
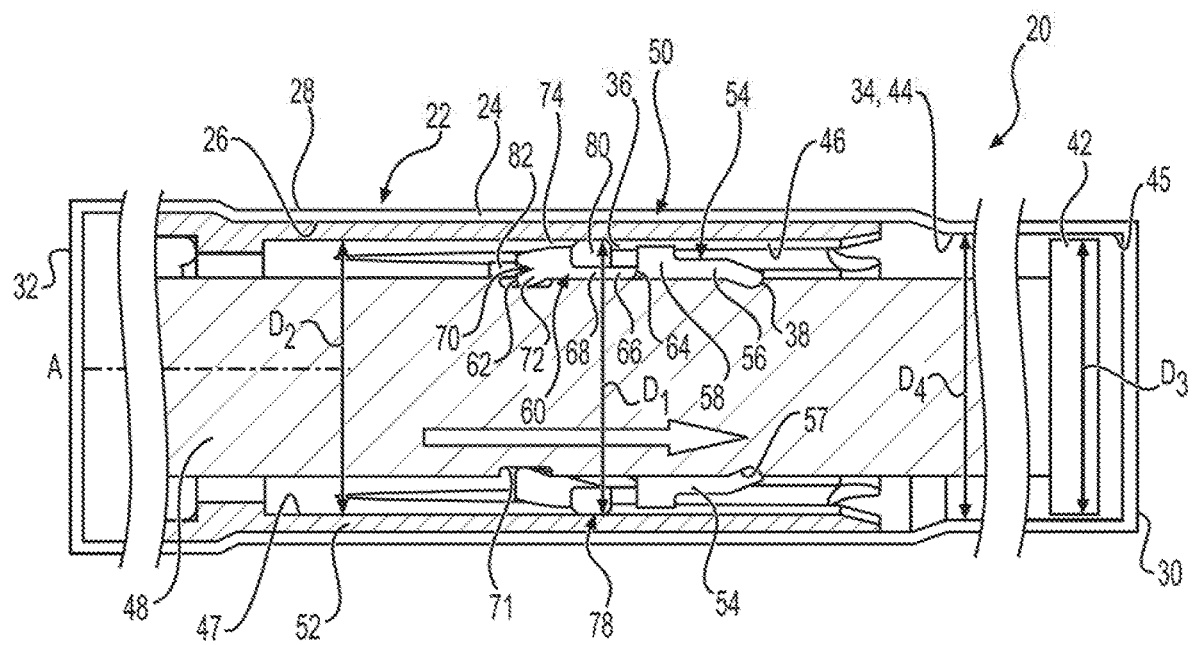
FIG. 2A is a side cross-sectional view of a shock absorber assembly illustrating movement of a piston rod in a rebound stroke and a piston ring in an unblocked position.
FIG. 2B is a perspective view of a ring guide and piston ring with the piston ring in an unblocked position.

As best illustrated in FIGS. 1A and 2A, the shock absorber assembly 20 includes a housing 22 that presents a wall 24 disposed about and along an axis A. The wall 24 has an inner surface 26 and an outer surface 28 and extends axially between a first end 30 (schematically shown) and a second end 32 (schematically shown). The housing 22 defines a main chamber 34 between the ends 30, 32 and the inner surface 26. The first end 30 of the wall 24 may be coupled with a frame, or other component of the vehicle.

A piston 42 (schematically shown) is disposed in the main chamber 34 and sealingly engages the inner surface 26 of the wall 24. The piston 42 is axially slideable for providing a damping force in response to axial movement thereof. The piston 42 divides the main chamber 34 into a compression chamber 45 between the piston 42 and the first end 30, and a rebound chamber 44 between the piston 42 and the second end 32. A piston rod 48 is attached to the piston 42 and is axially moveable along the center axis A for providing the movement of the piston 42. The piston rod 48 may be coupled with a wheel assembly of the vehicle such that vibrations are dampened during relative movement of the wheel assembly and frame of the vehicle. The piston rod 48 may be connected to other locations of the vehicle. The piston rod 48 and piston 42 are moveable in a compression stroke toward the first end 30 of the housing 22, and a rebound stroke toward the second end 32 of the housing 22.

A hydraulic stop mechanism 50 is disposed in the rebound chamber 44 for providing an additional damping force in response to axial movement of the piston 42. The hydraulic stop mechanism 50 includes a collar 52 fixed against the inner surface 26 of the wall 24. The collar 52 reduces the effective inner radius of the wall 24 of the housing 22 along the axial length of the collar 52.

The hydraulic stop mechanism 50 further includes a retainer 54 fixed to and extending annularly about the piston rod 48. The retainer 54 extends axially between a proximal end 36 and a coupling end 38 and is generally disposed in axial alignment with the collar 52. The retainer 54 includes a tube portion 56 axially between the proximal end 36 and the coupling end 38. The tube portion 56 is biased radially inwardly into a detent 57 defined by the piston rod 48 at the coupling end 38 to secure the retainer 54 to the piston rod 48 at a predetermined axial location. An annular seat 58 extends radially outwardly from the tube portion 56 at the proximal end 36. A radial gap is defined radially between the annular seat 58 and the collar 52 for allowing fluid to pass therethrough during movement of the piston 42 and piston rod 48. The retainer 54 is preferably of a flexible plastic material to allow it to be snapped about the piston rod 48, but it should be appreciated that it could be of other materials.

As best illustrated in FIGS. 1A-2B, 3 and 4 the hydraulic stop mechanism 50 further includes a ring guide 60 disposed about and fixed to the piston rod 48 in axially abutting relationship with the proximal end 36 of the retainer 54. More particularly, the ring guide 60 extends between an upper surface 64 disposed axially against the seat 58 of the retainer 54, and a lower surface 62 that is axially spaced from the upper surface 62. The ring guide 60 has a generally ring-shaped base portion 66 at the upper surface 64. A plurality of legs 68 extend axially from the base portion 66 and each terminate at one of a plurality of catchers 70. The legs 68 are arranged in circumferentially spaced relationship with one another. Each catcher 70 extends circumferentially between a corresponding pair of the legs 68. The catchers 70 are spaced circumferentially from one another. Each of the catchers 70 has an inner portion 72 that is biased radially inwardly toward the piston rod 48 to fix the ring guide 60 to the piston rod 48. More particularly, the piston rod 48 defines an annular recess 71 that receives the inner portion 72 of the catchers 70 to retain the ring guide 60 at a predetermined axial position along the piston rod 48. Each of the catchers 70 also has an outer portion 74 that extends radially outwardly. Each of the catchers 70 also defines a channel 76 that extends axially therethrough at a location that is radially inward of the outer portion 74. The ring guide 60 is preferably of a flexible plastic material to allow it to be snapped about the piston rod 48, but it should be appreciated that i could be of other materials.

As best illustrated in FIGS. 1A-2B, 3 and 5, the hydraulic stop mechanism 50 further includes a piston ring 78 that is disposed about and axially slideable along the base portion 66 and legs 68 of the ring guide 60. The piston ring 78 is preferably of a flexible plastic material. It should be appreciated that the piston ring 78 could be of other materials. The piston ring 78 divides the rebound chamber 44 into a first rebound region 46 between the piston ring 78 and the piston 42, and a second rebound region 47 between the piston ring 78 and the second end 42 of the housing 22. Axial movement of the piston ring 78 is limited by the catchers 70 of the ring guide 60 and the seat 58 of the retainer 54. The piston ring 78 is disposed in radial sealing engagement against an inside surface of the collar 52. More particularly, the piston ring 78 has a first diameter $D_1$ that is substantially the same, but slightly smaller than a second diameter $D_2$ of the inside surface of the collar 52 to allow sealing, sliding movement of the piston ring 78 relative to the collar 52. The piston 42 has a third diameter $D_3$ which is substantially the same as, but slightly smaller than a fourth diameter $D_4$ of the inner surface 26 of the wall 24 of the housing 22 to allow sliding movement of the piston 42 relative to the housing 22. According to the subject embodiment, the first diameter $D_1$ of the piston ring 78 is smaller than the third diameter $D_3$ of the piston 42, however, the diameters $D_1$-$D_4$ could be varied to optimize the damping effect provided by the subject assembly 20.

Figure 1B:
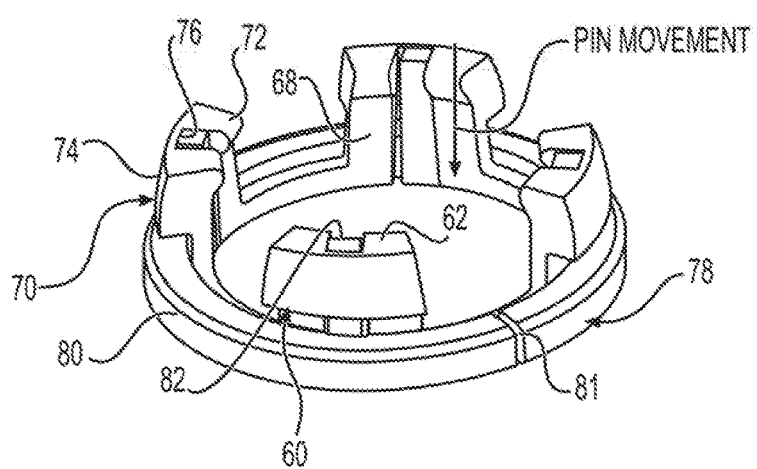
FIG. 1B is a perspective view of a ring guide and piston ring with the piston ring in the blocked position.
Figure 3:
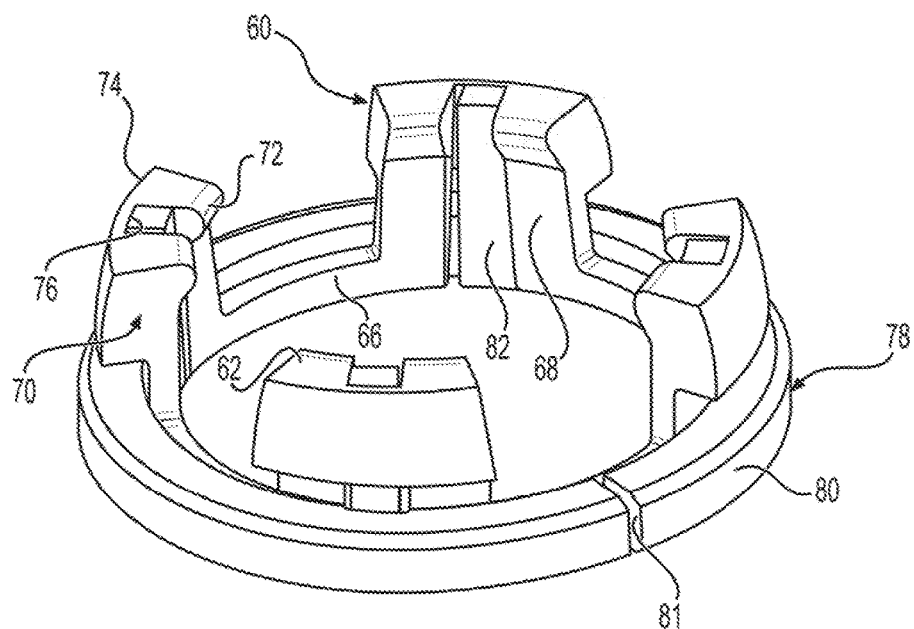
FIG. 3 is a perspective view of an example embodiment of a ring guide and piston ring of a shock absorber according to an aspect of the disclosure.
Figure 4:
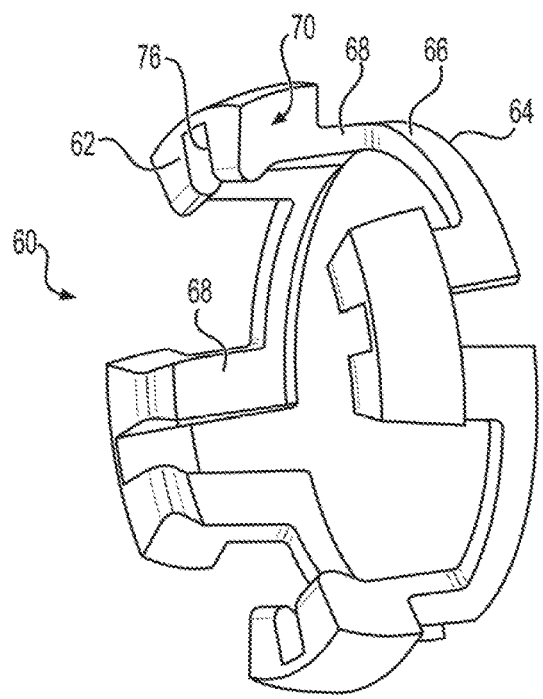
FIG. 4 is a perspective view of the ring guide of FIG. 3.
Figure 5:
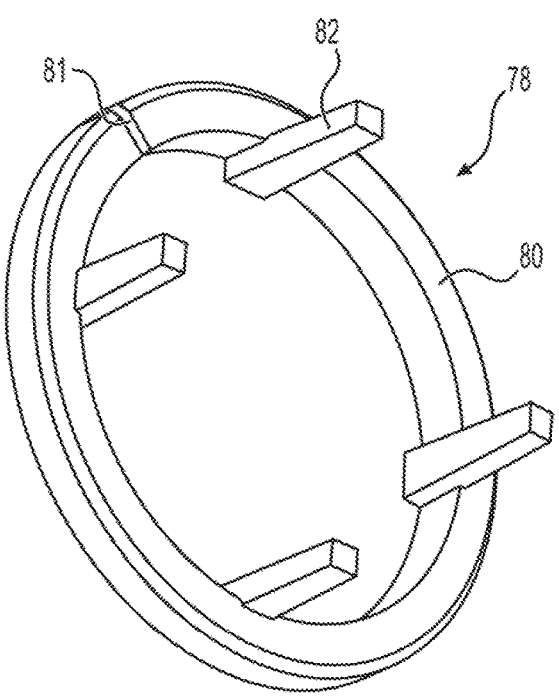
FIG. 5 is a perspective view of the piston ring of FIG. 3.

As best shown in FIGS. 3 and 5, the piston ring 78 has a generally ring-shaped ring portion 80 and a plurality of stabilizer pins 82 that each extend axially from the ring portion 80. The ring portion 80 defines a circumferential gap 81 extending in parallel relationship with the center axis A for accommodating expansion and contraction of the piston ring 78. As best illustrated by FIGS. 1B, 2B and 3, each of the stabilizer pins 82 is received by one of the channels 76 of the catchers 70 for preventing radially outward movement of the ring portion 80 that can be caused by a deflection under a radial force generated by flowing oil (discussed in further detail below).

The piston ring 78 is moveable axially between a blocked position (e.g., FIGS. 1A-1B) and an unblocked position (e.g., FIGS. 2A-2B). As illustrated in FIG. 1A, the piston ring 78 is biased in the blocked position when the piston 42 moves in the rebound stroke. While in the blocked position, the piston ring 78 is axially disposed against the annular seat 58 of the retainer 54 to close the fluid communication between the first compression chamber 46 and the second rebound region 47 through the channel 76 and gap between the seat 58 of the retainer 54 and the collar 52 to provide an additional damping force. As illustrated in FIG. 2A, the piston ring 78 is biased into the unblocked position when the piston 42 moves in the compression stroke. While in the unblocked position, the piston ring 78 is disposed against/adjacent to the catchers 70 to establish fluid communication between the first rebound region 46 and the second rebound region 47 through the channels 76 and gap between the seat 59 of the retainer 54 and the collar 52 to provide a smaller damping force than is provided while the piston ring 78 is in the blocked position.

It should be appreciated that during operation of the subject shock absorber 20 assembly, the stabilizer pins 82 reduce potential radial deformation of the piston ring 78. More particularly, because the stabilizer pins 82 are each received by one of the channels 76 of the catchers 70, they cooperate with the catchers 70 to prevent radially outward movement toward the collar 52 that can be caused by a deflection under a radial force generated by flowing oil. Because radial deformation of the piston ring 78 is prevented, undesired oil passage between the first and second rebound regions 46, 47, and thus undesirable damping characteristics are prevented.

In accordance with the above, the subject shock absorber assembly 20 provides noise elimination, reduction of lag issues, mass reduction, an easy to assemble, simple integrally constructed, compact assembly, and feasibility to add a pre-load setup. It should be appreciated that the number of stabilizer pins 82 and corresponding channels 76 can vary for different applications depending on requirements, e.g., velocity, lag, and noise. Additionally, it should be appreciated that there are no limitations for applications of the subject hydraulic stop mechanism 50 with housings 22 and collars 52 of different diameters. According to another aspect of the disclosure, the subject assembly 20 could be provided without a collar 52. It should also be appreciated that the stabilizer pins 82 and channel 76 could be designed to add various amounts of pre-load between components.

Obviously, many modifications and variations of the present invention are possible in light of the above teachings and may be practiced otherwise than as specifically described while within the scope of the appended claims.

What is claimed is:

1. A shock absorber assembly, comprising:
   a housing disposed about and along a center axis and extending between a first end and a second end and defining a main chamber;
   a piston disposed in said main chamber and axially moveable for providing a damping force in response to movement of said piston;
   a piston rod attached to said piston and moveable with said piston;
   a hydraulic stop mechanism for providing an additional damping force in response to axial movement of said piston rod, said hydraulic stop mechanism including a retainer extending about and fixed to said piston rod;
   said hydraulic stop mechanism further including a ring guide fixed to said piston rod and having a base portion axially adjacent to said retainer and a plurality of catchers each connected to and spaced axially from said base portion and each having a radially outer portion;
   each of said catchers defining a respective channel, each of said channels extending axially;
   said hydraulic stop mechanism further including a piston ring axially moveable along said ring guide between said catchers and said retainer and sealed radially relative to said housing;
   said piston ring having a ring portion moveable axially between a blocked position and an unblocked position, wherein said ring portion axially abuts said retainer in said blocked position to close said channels to provide an additional damping force, and wherein said ring portion is axially spaced from said retainer when said ring portion is in said unblocked position to allow fluid to pass through said channels to provide a smaller damping force than when said ring portion is in said blocked position; and
   said piston ring further including a plurality of stabilizer pins extending axially from said ring portion and each received by one of said channels of said catchers radially inward of said radially outer portions of said catchers for preventing radially outward movement of said ring portion;
   wherein said plurality of said catchers are spaced circumferentially from one another and wherein said plurality of stabilizer pins are spaced circumferentially from one another.

2. The shock absorber assembly as set forth in claim 1 wherein said base portion of said ring guide has a ring shape.

3. The shock absorber assembly as set forth in claim 1 wherein said ring guide includes a plurality of legs each extending axially between one of said catchers and said base portion, and wherein said ring portion of said piston ring axially slides along said plurality of legs during said axial movement of said piston ring.

4. The shock absorber assembly as set forth in claim 3 wherein said plurality of catchers each further includes an inner portion radially opposite said outer portion, and wherein said inner portion of each of said catchers engages and is biased toward said piston rod to fix said ring guide to said piston rod.

5. The shock absorber assembly as set forth in claim 4 wherein said piston rod defines an annular recess receiving said inner portion of each of said catchers to align said ring guide at a predetermined axial position along said piston rod.

6. The shock absorber assembly as set forth in claim 4 wherein said outer portion of each of said catchers extends radially outwardly and is disposed radially outward of said inner portion of each of said catchers and said legs of said ring guide.

7. The shock absorber assembly as set forth in claim 1 wherein said ring portion of said piston ring defines a circumferential gap extending in parallel relationship with said center axis for accommodating expansion and contraction of said piston ring.

8. The shock absorber assembly as set forth in claim 1 wherein said piston ring is made of a plastic material.

9. The shock absorber assembly as set forth in claim 1 wherein said ring guide is made of a plastic material.

10. The shock absorber assembly as set forth in claim 1 wherein said retainer is made of a plastic material.

11. The shock absorber assembly as set forth in claim 1 wherein said plurality of catchers includes four of said catchers and wherein said channels include four channels each defined by one of said four catchers.

12. The shock absorber assembly as set forth in claim 11 wherein said plurality of stabilizer pins includes four of said stabilizer pins, each of said four of said stabilizer pins is received by one of said four channels.

13. The shock absorber assembly as set forth in claim 1 wherein said piston divides said main chamber into a compression chamber axially between said piston and said first end of the housing, and a rebound chamber axially between said piston and said second end of said housing, and wherein said piston is moveable toward said first end of said housing in a compression stroke, and wherein said piston is moveable toward said second end of said housing in a rebound stroke.

14. The shock absorber assembly as set forth in claim 13 wherein said piston ring is configured to move into said blocked position when said piston moves in said rebound stroke, and wherein said piston ring is configured to move into said unblocked position when said piston moves in said compression stroke.

15. The shock absorber assembly as set forth in claim 14 wherein said hydraulic stop mechanism is positioned in said rebound chamber, wherein said piston ring divides said rebound chamber into a first rebound region between said piston ring and said piston and a second rebound region between said piston ring and said second end of said housing.

16. The shock absorber assembly as set forth in claim 1 wherein said housing includes a wall having an inner surface and an outer surface, and wherein a collar is fixed against said inner surface of said wall for reducing the effective inner radius of said wall along an axial length of said collar, and wherein said piston ring is radially sealed relative to said collar.

17. The shock absorber assembly as set forth in claim 16 wherein said piston ring has a first diameter that is substantially the same as a second diameter of an inside surface of said collar.

18. The shock absorber assembly as set forth in claim 1 wherein said retainer includes a tube portion extending axially between a proximal end and a coupling end, and includes a seat extending radially outwardly at said proximal end for being axially engaged by said piston ring when said piston ring is in said blocked position.

19. The shock absorber assembly as set forth in claim 18 wherein said tube portion extends radially inwardly into said piston rod at said coupling end to secure said retainer to said piston rod.

20. A shock absorber assembly, comprising:
a housing disposed about and along a center axis and extending between a first end and a second end and defining a main chamber;
a piston disposed in said main chamber and axially moveable for providing a damping force in response to movement of said piston;
a piston rod attached to said piston and moveable with said piston;
a hydraulic stop mechanism for providing an additional damping force in response to axial movement of said piston rod, said hydraulic stop mechanism including a retainer extending about and fixed to said piston rod;
said hydraulic stop mechanism further including a ring guide fixed to said piston rod and having a base portion axially adjacent to said retainer and a plurality of catchers each connected to and spaced axially from said base portion and each having a radially outer portion;
each of said catchers defining a respective channel, each of said channels extending axially;
said hydraulic stop mechanism further including a piston ring axially moveable along said ring guide between said catchers and said retainer and sealed radially relative to said housing;
said piston ring having a ring portion moveable axially between a blocked position and an unblocked position, wherein said ring portion axially abuts said retainer in said blocked position to close said channels to provide an additional damping force, and wherein said ring portion is axially spaced from said retainer when said ring portion is in said unblocked position to allow fluid to pass through said channels to provide a smaller damping force than when said ring portion is in said blocked position; and
said piston ring further including a plurality of stabilizer pins extending axially from said ring portion and each received by one of said channels of said catchers radially inward of said radially outer portions of said catchers for preventing radially outward movement of said ring portion,
wherein said housing includes a wall having an inner surface and an outer surface, and wherein a collar is fixed against said inner surface of said wall for reducing the effective inner radius of said wall along an axial length of said collar, and wherein said piston ring is radially sealed relative to said collar.

* * * * *